United States Patent
Yoon et al.

(10) Patent No.: US 9,610,846 B2
(45) Date of Patent: Apr. 4, 2017

(54) INTEGRATED ELECTRONIC POWER CONTROL UNIT OF VEHICLE

(71) Applicants: Hyundai Motor Company, Seoul (KR); Kia Motors Corporation, Seoul (KR)

(72) Inventors: Jaehoon Yoon, Seoul (KR); Wooyong Jeon, Seoul (KR); Jung Hong Joo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 547 days.

(21) Appl. No.: 14/041,179

(22) Filed: Sep. 30, 2013

(65) Prior Publication Data
US 2014/0239712 A1    Aug. 28, 2014

(30) Foreign Application Priority Data
Feb. 22, 2013   (KR) .......................... 10-2013-0019431

(51) Int. Cl.
*B60L 1/00* (2006.01)
*B60L 11/18* (2006.01)
(Continued)

(52) U.S. Cl.
CPC ............ *B60L 11/1803* (2013.01); *B60L 1/00* (2013.01); *B60L 11/123* (2013.01); *B60L 11/14* (2013.01); *B60L 11/1861* (2013.01); *B60L 11/1868* (2013.01); *B60L 15/007* (2013.01); *B60K 6/22* (2013.01); *B60L 2210/10* (2013.01); *B60L 2210/40* (2013.01); *Y02T 10/6217* (2013.01); *Y02T 10/645* (2013.01); *Y02T 10/7005* (2013.01); *Y02T 10/7022* (2013.01);
(Continued)

(58) Field of Classification Search
CPC ............................ B60K 6/22; B60L 11/1803
See application file for complete search history.

(56) References Cited

U.S. PATENT DOCUMENTS

| | | | |
|---|---|---|---|
| 2003/0146726 A1* | 8/2003 | Ishikawa | B60L 3/0046 318/442 |
| 2008/0186751 A1* | 8/2008 | Tokuyama | H01L 23/473 363/131 |

FOREIGN PATENT DOCUMENTS

| | | |
|---|---|---|
| CN | 101795054 A | 8/2010 |
| CN | 102085861 A | 6/2011 |

(Continued)

*Primary Examiner* — Daniel Cavallari
(74) *Attorney, Agent, or Firm* — Mintz Levin Cohn Ferris Glovsky and Popeo, P.C.; Peter F. Corless

(57) ABSTRACT

An integrated electronic power control unit of an environmentally friendly vehicle includes an inverter and an LDC (low voltage DC-DC converter), which share a DC input terminal. In the integrated electronic power control unit, the inverter is an electronic power control unit that drives a motor by converting DC voltage into AC voltage, and the low voltage DC-DC converter serves as another electronic power control unit that charges a low-voltage battery by converting DC high voltage into low voltage DC voltage, where the inverter includes a capacitor module composed of a capacitor leveling input voltage and a capacitor removing noise of the input voltage, and the inverter and the low voltage DC-DC converter are integrated such that the output of the capacitor module of the inverter becomes the output of the low voltage DC-DC converter.

3 Claims, 7 Drawing Sheets

(51) Int. Cl.
*B60L 11/12* (2006.01)
*B60L 11/14* (2006.01)
*B60L 15/00* (2006.01)
*B60K 6/22* (2007.10)

(52) U.S. Cl.
CPC ........ *Y02T 10/7044* (2013.01); *Y02T 10/7066* (2013.01); *Y02T 10/7077* (2013.01); *Y02T 10/7216* (2013.01); *Y02T 10/7241* (2013.01)

(56) References Cited

FOREIGN PATENT DOCUMENTS

| | | |
|---|---|---|
| CN | 102684248 A | 9/2012 |
| WO | 2011/125779 A1 | 10/2011 |
| WO | 2012/150953 A1 | 11/2012 |

* cited by examiner

INTEGRATED ELECTRONIC POWER CONTROL UNIT OF VEHICLE

CROSS-REFERENCE TO RELATED APPLICATION

This application claims under 35 U.S.C. §119(a) priority to and the benefit of Korean Patent Application No. 10-2013-0019431 filed in the Korean Intellectual Property Office on Feb. 22, 2013, the entire contents of which are incorporated herein by reference.

BACKGROUND (a) Field of the Invention

The present invention relates to an integrated electronic power control unit sharing a DC input terminal of an environmentally friendly vehicle in which an inverter and an LDC (Low voltage DC-DC Converter), which are EPCUs (Electronic Power Control Units) in the environmentally-friendly vehicle, share a DC input terminal.

(b) Description of the Related Art

It is known to provide vehicles that are environmentally friendly, i.e., that have improved fuel efficiency, satisfy applicable governmental regulations, e.g., those of OBD (On Board Diagnosis) about exhaust gas, and which minimally use fossil fuels as a fuel source.

Such environmentally-friendly vehicles, including fuel cell vehicles, electric vehicles, plug-in electric vehicles, and hybrid vehicles, are equipped with one or more motors and an engine.

For example, environmentally-friendly vehicles may include a battery charged with power at high voltage for driving the motors, an inverter that is an electronic power control unit driving the motors by converting the DC high voltage of the battery into AC voltage, an LDC (Low voltage DC-DC Converter) that is also an electronic power control unit charging a low-voltage battery by converting DC high voltage into low DC voltage (for example, 12V), an engine clutch disposed between the engine and the motors to transmit power of the engine to a driving shaft, and various electronic power control units for controlling the operation of the environmentally-friendly vehicles.

Typically, environmentally-friendly vehicles can travel in an HEV (Hybrid Electric Vehicle) mode and an EV (Electric vehicle) mode by engaging or disengaging the engine clutch in accordance with the intention of acceleration/deceleration determined by the driver operating the acceleration pedal and the brake pedal, load, vehicle speed, and the SOC (State Of Charging) of the battery.

When an environmentally-friendly vehicle changes the traveling mode from the EV mode to the HEV mode, the engine clutch is engaged after the engine speed and the motor speed are synchronized so that torque does not change while power is transmitted between the engine and the motors, which utilize different power sources, thereby ensuring drivability.

Environmentally-friendly vehicles typically include an inverter and a low voltage DC-DC converter, as described above. The inverter and the low voltage DC-DC converter may be implemented, for example, by separate individual circuits, as shown in FIGS. 1 and 2, or an integrated circuit, as shown in FIG. 3.

FIG. 1 (RELATED ART) shows an example of the circuit configuration of the inverter, and FIG. 2 (RELATED ART) shows an example of the circuit configuration of the low voltage DC-DC converter.

FIG. 3 (RELATED ART) shows a circuit configuration obtained by simply integrating the inverter shown in FIG. 1 with the voltage DC-DC converter shown in FIG. 2.

The inverter can be called an MCU (Motor Control Unit) in the vehicle trade, because it is an electronic power control unit that drives a motor by converting DC high voltage into AC voltage.

Referring to FIG. 1, an inverter 10 is configured such that DC high voltage HV inputted to a DC input terminal passes through a capacitor module 12 composed of a plurality of capacitors, and the DC high voltage that has passed through the capacitor module 12 is converted into AC by a power conversion module 14, thereby driving a motor 20.

In the capacitor module 12 of the inverter 10, a DC capacitor 12a, which is a capacitor that levels input voltage, is generally a large-sized device, as apparent to those skilled in the art, and a Y capacitor 12b, a capacitor reducing noise in input voltage, is generally a small-sized device. Therefore, the capacitor module 12 of the inverter 10 is composed of the large-sized DC capacitor 12a and the small-sized Y capacitor 12b.

Referring to FIG. 2, the low voltage DC-DC converter 30 is configured such that DC high voltage HV passes a choke coil 31, a Y capacitor 32b, and an X capacitor 32c, and is converted across a plurality of various devices including a plurality of MOSFETs 33, a coil, a transformer, an inductor, a diode, and a capacitor, and then outputted.

The Y capacitor 32b and the X capacitor 32c included in the low voltage DC-DC converter 30, which are capacitors for removing noise in input voltage, are generally small-sized devices.

Referring to FIGS. 1 to 3, it can be seen that an inverter and a low voltage DC-DC converter according to the related art are separate individual electronic power control units or integrated simply in one package, such that they do not share a DC voltage input terminal.

Therefore, the inverter and the low voltage DC-DC converter according to an embodiment of the related art have the problem in that they decrease spatial availability in environmentally-friendly vehicles and increase the manufacturing cost.

The Description of the Related Art is made to help understanding the background of the present invention and may include matters out of the related art known to those skilled in the art.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an integrated electronic power control unit sharing a DC input part of an environmentally friendly vehicle having advantages of being able to decrease the size of an electronic power control unit, improve the performance, and reduce the cost, by allowing an inverter and an LDC (Low voltage DC-DC Converter), which are EPCUs (Electronic Power Control Unit) in an environmentally-friendly vehicle, to share a DC input terminal.

An exemplary embodiment of the present invention provides an integrated electronic power control unit of an environmentally-friendly vehicle including an inverter that is an electronic power control unit driving a motor by converting DC voltage into AC voltage and a low voltage DC-DC converter that is an electronic power control unit charging a low-voltage battery by converting DC high voltage into low voltage DC voltage, in which the inverter may include a capacitor module composed of a capacitor leveling input voltage and a capacitor removing noise of the input voltage, and the inverter and the low voltage DC-DC converter may be integrated such that the output of the capacitor module of the inverter becomes the output of the low voltage DC-DC converter.

The capacitor module of the inverter may take charge of the function of the capacitor in the low voltage DC-DC converter.

The inverter and the low voltage DC-DC converter may share cooling channels.

The capacitor module may be disposed close to or between the cooling channels.

As described above, according to an exemplary embodiment of the present invention, it is possible to achieve the following effects by sharing the capacitor module functioning as a DC input terminal of the inverter with a low voltage DC-DC converter and by allowing the inverter and the low voltage DC-DC converter to share the cooling channels.

First, it is possible to reduce the size of a package by integrating the inverter and the low voltage DC-DC converter, such that it is possible to easily use the engine room layout of an environmentally-friendly vehicle.

Second, since the capacitor module of the inverter functions as both a filter in the inverter and an additional filter of the low voltage DC-DC converter, it is possible to considerably reduce noise more than the related art, and therefore, it is possible to improve and optimize electromagnetic wave performance of an environmentally-friendly vehicle.

Third, by means of the structure sharing the cooling channels, it is possible to reduce the manufacturing cost of a housing, and reduce the cost with simplification of the cooling channels.

DETAILED DESCRIPTION OF THE EMBODIMENTS

Figure 1:
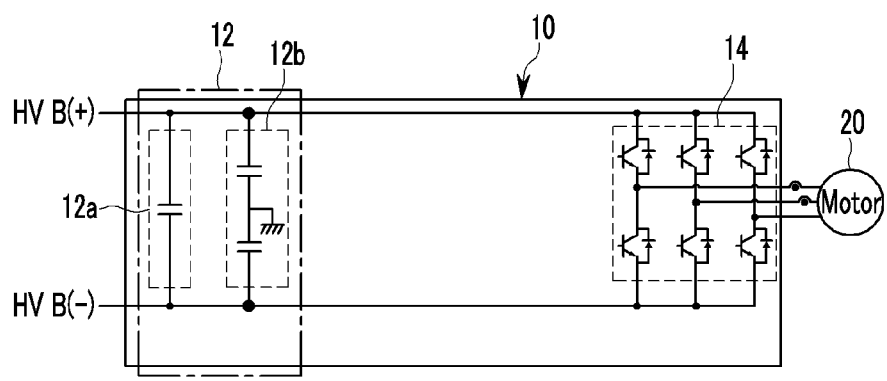
FIG. 1 (RELATED ART) is a circuit schematic diagram of an inverter in an environmentally-friendly vehicle according to the related art.

Hereinafter, the present invention will be described more fully hereinafter with reference to the accompanying drawings, in which exemplary embodiments of the invention are shown. However, the present invention is not limited to the exemplary embodiments described herein and may be embodied in other ways.

Like reference numerals are given to like components throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, as provided herein, environmentally-friendly vehicles include fuel cell vehicles, electric vehicles, plug-in electric vehicles, and hybrid vehicles, and the like, and preferably are equipped with one or more motors and an engine.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 4:
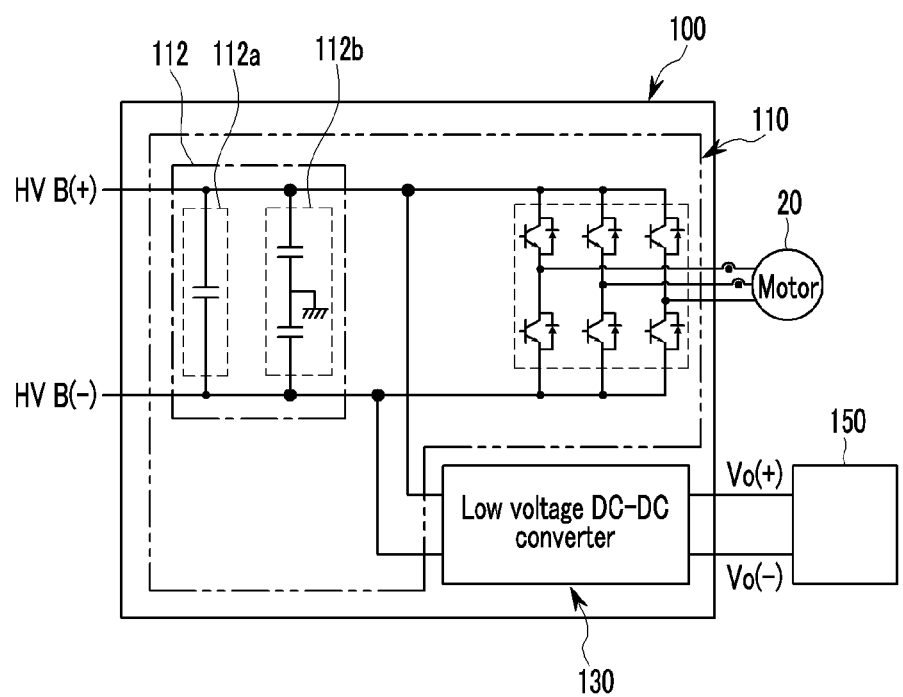
FIG. 4 is a circuit schematic diagram of an integrated electronic power control unit of an environmentally-friendly vehicle in which an inverter and a low voltage DC-DC converter are integrated to share an input terminal in accordance with an exemplary embodiment of the present invention.

FIG. 4 is a circuit schematic diagram of an integrated electronic power control unit of an environmentally-friendly vehicle according to an exemplary embodiment of the present invention.

Referring to FIG. 4, an integrated electronic power control unit according to an exemplary embodiment of the present invention includes an inverter 110 that drives a motor 20 by converting DC voltage into AC voltage, and a low voltage DC-DC converter 130 that charges a low-voltage battery 150 by converting DC high voltage into low voltage DC voltage.

The inverter 110 may include a capacitor module 112 composed of a DC capacitor 112a leveling input high voltage HV and a Y capacitor 112b removing noise of the input high voltage.

Although the capacitor module 112 according to an exemplary embodiment of the present invention and the capacitor module according to an exemplary embodiment of the related art may be the same, it should be understood that the scope of the present invention is not limited thereto. The spirit of the present invention can be applied to a configuration that levels the input high voltage and removes noise of the input high voltage, even if it is a different configuration.

The inverter 110 and the low voltage DC-DC converter 130 are connected by a circuit such that the output of the capacitor module 112 of the inverter becomes the input of the low voltage DC-DC converter 130, as shown in FIG. 4.

As shown in FIG. 4, when the inverter 110 and the low voltage DC-DC converter 130 are connected, the capacitor module 112 of the inverter 110 can function as both of a filter of the inverter 110 and an additional filter of the low voltage DC-DC converter 130.

Therefore, according to an exemplary embodiment of the present invention, it is possible to more efficiently remove the noise in input voltage as compared to the related art.

Figure 2:
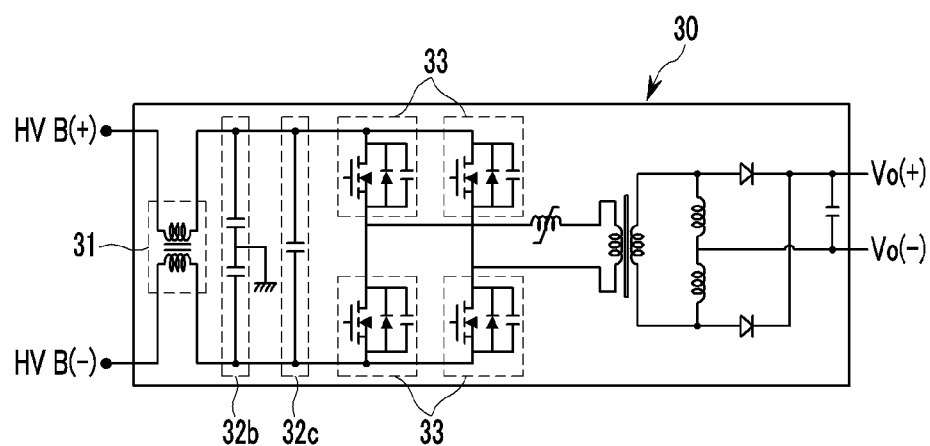
FIG. 2 (RELATED ART) is a circuit schematic diagram of a low voltage DC-DC converter in an environmentally-friendly vehicle according to the related art.
Figure 3:
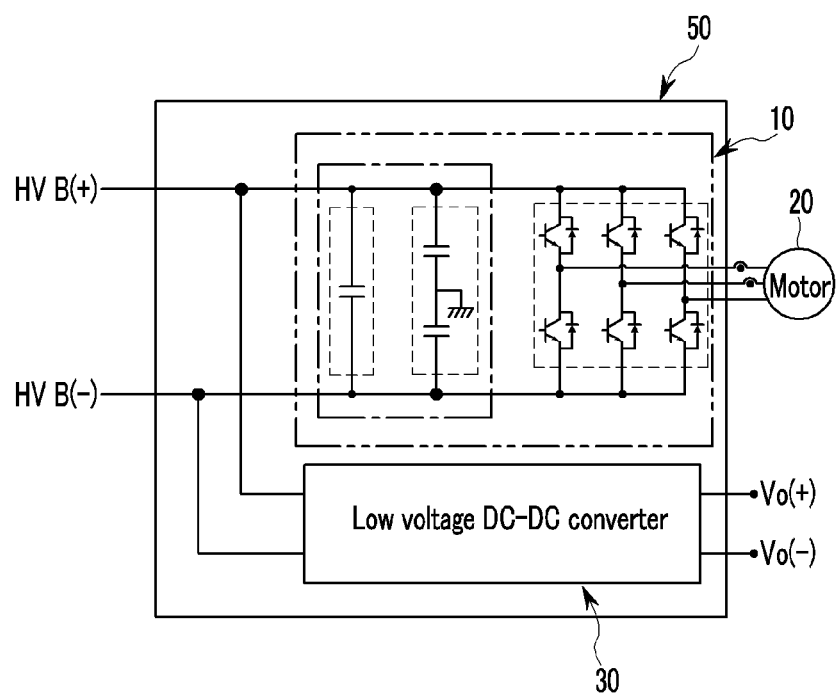
FIG. 3 (RELATED ART) is a circuit schematic diagram where an inverter and a low voltage DC-DC converter according to the related art are simply integrated.

On the other hand, as shown in FIG. 4, when the inverter 110 and the low voltage DC-DC converter 130 are connected such that the output of the capacitor module 112 of the inverter 110 becomes the input of the low voltage DC-DC converter 130, the capacitor module 112 of the inverter 110 can function as a capacitor in the low voltage DC-DC converter 130, for example, the Y capacitor 32b and the X capacitor 32c shown in FIG. 2.

Figure 5:
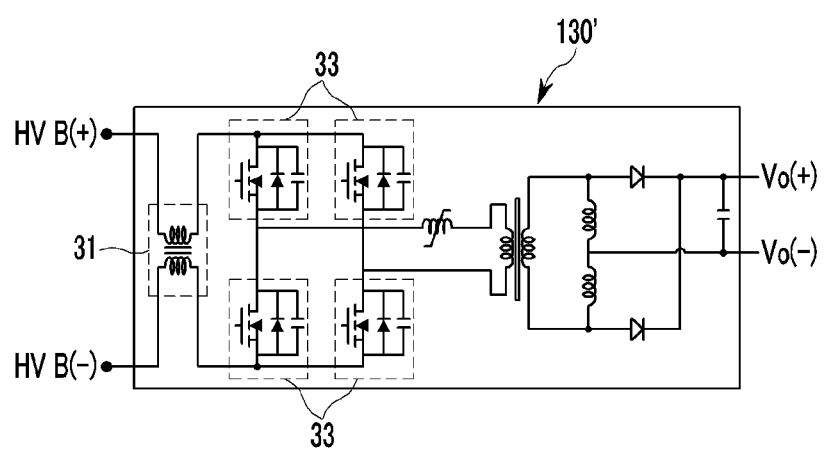
FIG. 5 is another circuit schematic diagram of a low voltage DC-DC converter included in an integrated electronic power control unit of an environmentally-friendly vehicle according to an exemplary embodiment of the present invention.

Accordingly, in another exemplary embodiment of the present invention, as shown in FIG. 5, the Y capacitor 32b and the X capacitor 32c can be removed, as in a low voltage DC-DC converter 130'. Therefore, according to another exemplary embodiment of the present invention, it is possible to reduce the costs of parts and achieve a more compact size.

Figure 6:
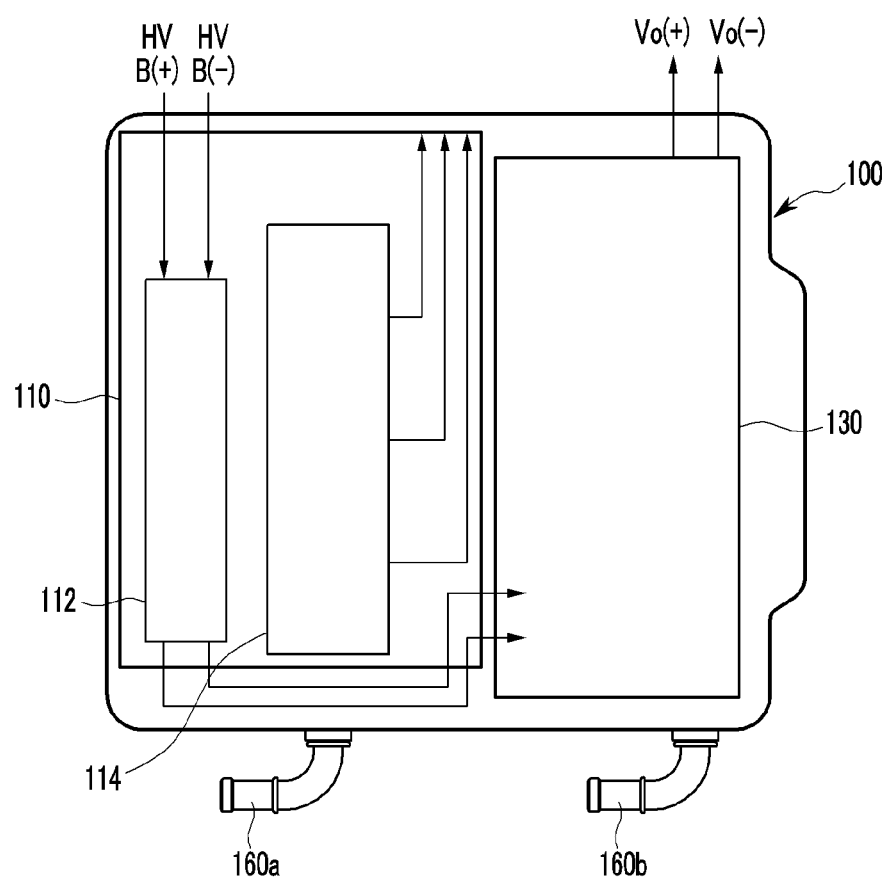
FIG. 6 is a layout schematic diagram of an integrated electronic power control unit of an environmentally-friendly vehicle according to an exemplary embodiment of the present invention.

FIG. 6 is a diagram showing a package layout of an integrated electronic power control unit according to an exemplary embodiment of the present invention.

Referring to FIG. 6, the inverter 110 and the low voltage DC-DC converter 130 in the integrated electronic power control unit 100 according to an exemplary embodiment of the present invention can share cooling channels formed by input and output coolant pipes 160a and 160b.

In particular, in the integrated electronic power control unit 100 according to an exemplary embodiment of the present invention, the cooling channels formed by the input and output coolant pipes 160a and 160b are shared to cool a package of the capacitor module 112, an inverter power module 114, and the low voltage DC-DC converter which are arranged in parallel, as shown in FIG. 6.

Since the capacitor module 112 are shared by the inverter 110 and the low voltage DC-DC converter 130, it may generate an excess amount of heat.

Figure 7:
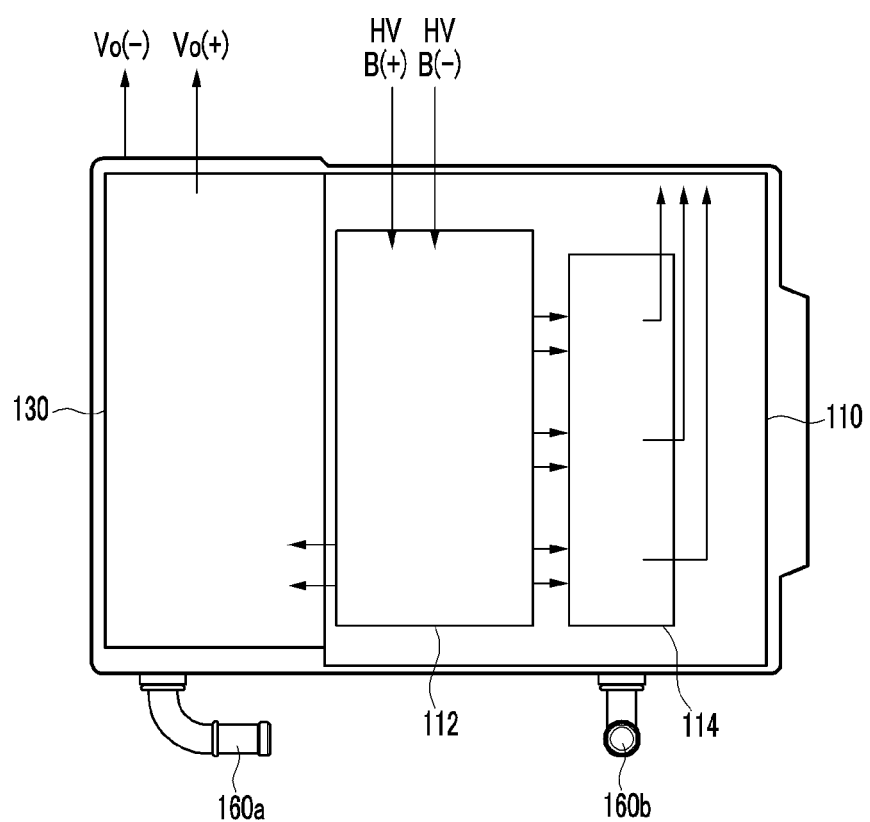
FIG. 7 is a layout schematic diagram of an integrated electronic power control unit of an environmentally-friendly vehicle according to another exemplary embodiment of the present invention.

Accordingly, in another exemplary embodiment of the present invention, the capacitor module 112 may be disposed close to or between the cooling channels implemented by the coolant pipes 160a and 160b, as shown in FIG. 7, in order to more efficiently remove the heat of the capacitor module 112.

In particular, in another exemplary embodiment of the present invention, the capacitor module 112 may be disposed close to or between the low voltage DC-DC converter 130 and the inverter power module 114, as shown in FIG. 7.

Therefore, according to an exemplary embodiment of the present invention, since an inverter and a low voltage DC-DC converter can share a capacitor module that is also the DC input terminal of the inverter and cooling channels, it is possible to decrease the size of an electronic power control unit with an inverter and a low voltage DC-DC converter integrated, improve the performance, and reduce the cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An integrated electronic power control unit of a vehicle, comprising:
   an inverter that is an electronic power control unit that drives a motor by converting DC voltage into AC voltage, and a low voltage DC-DC converter that is another electronic power control unit that charges a low-voltage battery by converting DC high voltage into low voltage DC voltage,
   wherein the inverter includes a capacitor module composed of a capacitor leveling input voltage and a capacitor removing noise of the input voltage,
   the inverter and the low voltage DC-DC converter share cooling channels,
   the capacitor module is disposed between the cooling channels,
   the inverter and the low voltage DC-DC converter are integrated such that the output of the capacitor module of the inverter becomes the input of the low voltage DC-DC converter, and
   an input terminal of the low voltage DC-DC converter is directly connected to an output terminal of the capacitor module of the inverter.

2. The integrated electronic power control unit of claim 1, wherein the integrated power control unit is configured to be installed in the vehicle, which is selected from the group consisting of: a fuel cell vehicle, an electric vehicle, a plug-in electric vehicle, and a hybrid vehicle.

3. A vehicle operable in at least an HEV (Hybrid Electric Vehicle) mode and an EV (Electric Vehicle) mode, comprising:
   an integrated power control unit, comprising:
   an inverter that is an electronic power control unit that drives a motor by converting DC voltage into AC voltage, and a low voltage DC-DC converter that is another electronic power control unit that charges a low-voltage battery by converting DC high voltage into low voltage DC voltage,
   wherein the inverter includes a capacitor module composed of a capacitor leveling input voltage and a capacitor removing noise of the input voltage,
   the inverter and the low voltage DC-DC converter share cooling channels,
   the capacitor module is disposed between the cooling channels,
   the inverter and the low voltage DC-DC converter are integrated such that the output of the capacitor module of the inverter becomes the input of the low voltage DC-DC converter, and
   an input terminal of the low voltage DC-DC converter is directly connected to an output terminal of the capacitor module of the inverter.

* * * * *